3,658,964
2-PHENYLACETYLBENZOIC ACID IN THE TREATMENT OF INFLAMMATION

Mario G. Buzzolini, Morristown, and Robert E. Manning, Mountain Lakes, N.J., assignors to Sandoz-Wander, Inc., Hanover, N.J.
No Drawing. Filed June 18, 1970, Ser. No. 47,566
Int. Cl. A61k 27/00
U.S. Cl. 424—317                    3 Claims

ABSTRACT OF THE DISCLOSURE

This disclosure relates to 2-phenylacetylbenzoic acid monohydrate. The compound is useful as an anti-inflammatory agent.

---

This invention relates to 2-phenylacetylbenzoic acid monohydrate, and to its use as an anti-inflammatory agent. The invention also relates to pharmaceutical compositions containing the above as an active ingredient thereof and the method of using such composition for the treatment of inflammation. The 2-phenylacetylbenzoic acid monohydrate of this invention may be represented by the following structural formula:

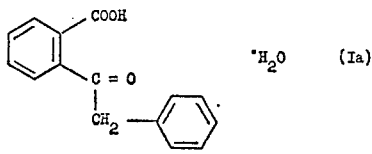

The compound of Formula Ia may also be illustrated by its tautomeric equivalent such as represented by the following structural formula:

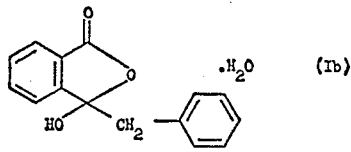

In order to simplify this description, however, Formula Ia only will be used. It should be nevertheless understood that the compound of Formula Ib may be represented as well as the compound of Formula Ia and the two tautomeric forms are within the concept of the present invention.

The compound of Formula Ia is known (C. L. Arcus, R. E. Marks, Reactions of Organic Azides, part VI, J. of Chem. Soc., pp. 1627–1633 (1957)), and the present invention only contemplates the novel use of such compound, particularly as an anti-inflammatory agent. This use is indicated by the activity of compound Ia in rats and tested using the adjuvant arthritis procedure substantially as described by Perrine, J. W. Takesue, E. I. (Arch. Int. Pharmacodyn, 174: 192, 1968).

As indicated, the compound of Formula Ia is useful as an anti-inflammatory agent. For such usage, the compound may be administered orally, parenterally or topically as such or admixed with conventional pharmaceutical carriers. The preferred mode of administration is internally e.g. orally or parenterally. It may be administered orally in such forms as tablets, dispersible powders, granules, capsules, syrups and elixirs, and parenterally as solutions, suspensions, dispersions, emulsion, and the like, e.g., a sterile injectable aqueous suspension. The compositions for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc, granulating and disintegrating agents, e.g., starch and alginic acid, binding agents, e.g., starch gelatin and acacia, and lubricating agents, e.g., magnesium stearate, stearic acid and talc. The tablets may be uncoated or coated by known techniques to delay disintegration and absorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan mono-oleate) and preservatives (ethyl-p-hydroxybenzoate). Capsules may contain the active ingredient alone or admixed with an inert solid diluent, e.g., calcoum carbonate, calcium phosphate and kaolin. The injectable compositions are formulated as known in the art and may contain appropriate dispersing or wetting agents and suspending agents identical or similar to those mentioned above. These pharmaceutical preparations may contain about 10–90% of the active ingredient in combination with the carrier or adjuvant.

The dosage of active ingredient employed for the alleviation of inflammation may vary depending on the severity of the condition being treated. However, in general, satisfactory results are obtained when the compound Ia is administered at a daily dosage of from about 0.1 mg. to about 100 mgs. per kg. of animal body weight, preferably given in divided doses two to four times a day, or in sustained release form. For most large mammals, the total daily dosage is from about 1 to about 750 mgs. Dosage forms suitable for internal use comprise from about 0.25 to about 375 mgs. of the active compound.

The preferred pharmaceutical compositions from the standpoint of preparation and ease of administration are solid compositions, particularly hard-filled capsules and tablets.

The following examples are provided for the purpose of illustration and not by way of limitation. They are not intended so as to limit the scope of the invention as defined in the appended claims.

EXAMPLE I

Tablets

Tablets suitable for oral administration which contain the following ingredients may be prepared by conventional tabletting techniques. Such tablets are useful in treating at a dose of one tablet 2 to 4 times a day.

| Ingredient: | Parts by weight |
|---|---|
| 2-phenylacetylbenzoic acid monohydrate | 50 |
| Tragacanth | 2 |
| Lactose | 39.5 |
| Corn starch | 5 |
| Talcum | 3 |
| Magnesium stearate | 0.5 |

EXAMPLE II

Dry filled capsules

Capsules suitable for oral administration which contain the following ingredients are prepared in a conventional manner. Such capsules are useful in treating inflammation at a dose of one capsule 2–4 times a day.

| Ingredient: | Parts by weight |
|---|---|
| 2-phenylacetylbenzoic acid monohydrate | 50 |
| Inert solid diluent (starch, lactose, kaolin) | 450 |

EXAMPLE III

Sterile solution for injection

The following ingredients are dissolved in water for injection. The resulting solution is filtered through an appropriate medium to render a clear solution. The solution is then autoclaved to render it sterile.

| Ingredient: | Parts by weight |
|---|---|
| 2-phenylacetylbenzoic acid monohydrate | 10. |
| Sodium alginate | 0.5. |
| Buffer system | As desired. |
| Lecithin | 0.5. |
| Sodium chloride | As desired. |
| Water for injection | To desired volume. |

What is claimed is:

1. A method for treating inflammation which comprises administering to a mammal suffering from inflammation an anti-inflammatory effective amount of a compound of the formula

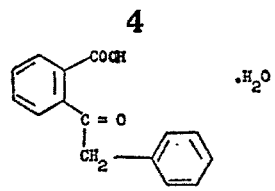

2. A method according to claim 1 wherein the compound is administered at a daily dose of from about 1 milligram to about 750 milligrams.

3. A method according to claim 1 wherein the compound is administered in a unit dosage form comprising said compound to the extent of from about 0.25 milligram to about 375 milligrams per unit dosage.

References Cited

Chem. Abst., 51–347e (1957).

STANLEY J. FRIEDMAN, Primary Examiner